May 12, 1931.  A. C. HAMILTON  1,804,687
MOTOR VEHICLE CONSTRUCTION
Filed Aug. 23, 1926  3 Sheets-Sheet 1
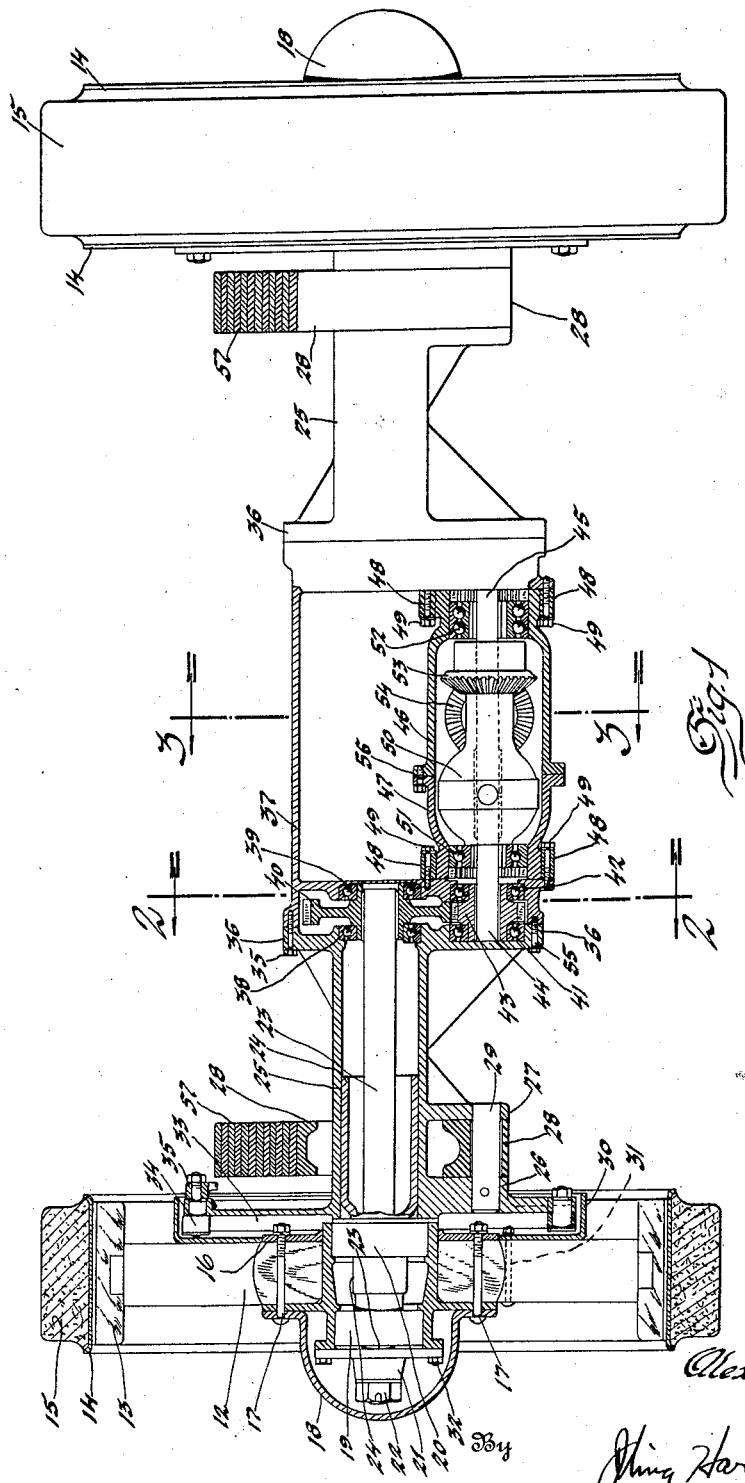

May 12, 1931.  A. C. HAMILTON  1,804,687
MOTOR VEHICLE CONSTRUCTION
Filed Aug. 23, 1926   3 Sheets-Sheet 2
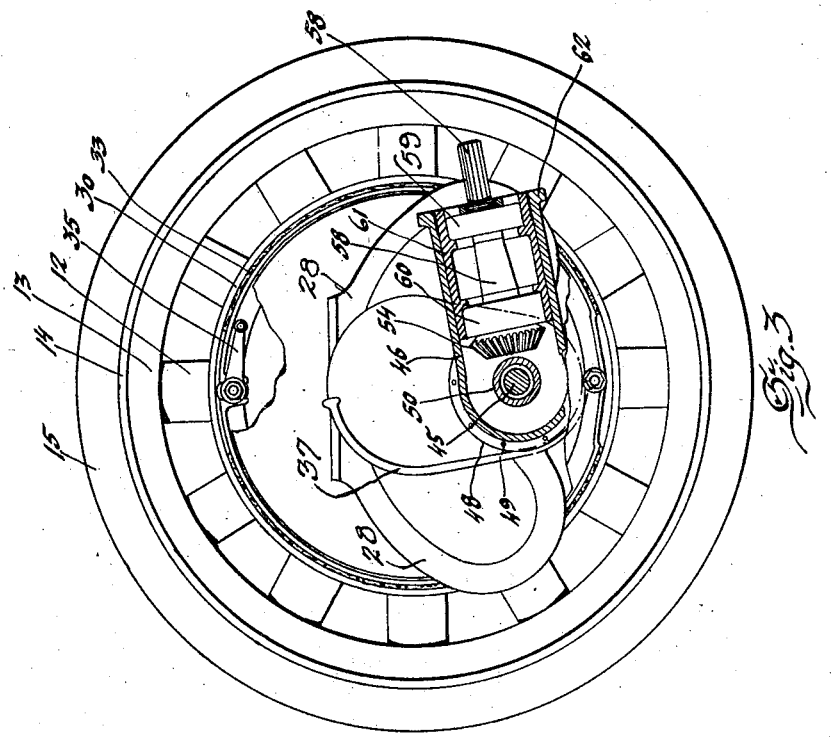
Inventor
Alexander C. Hamilton
By King Harness
Attorney

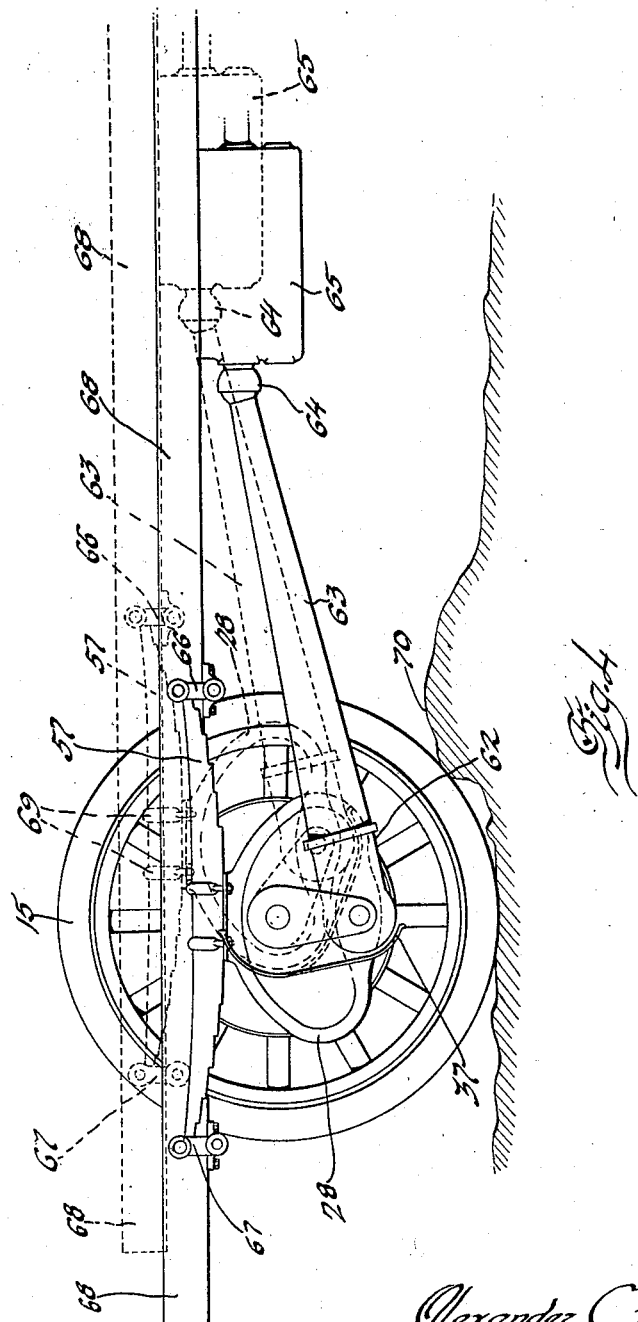

Patented May 12, 1931

1,804,687

UNITED STATES PATENT OFFICE

ALEXANDER C. HAMILTON, OF DETROIT, MICHIGAN, ASSIGNOR, BY MESNE ASSIGNMENTS, TO RELAY MOTOR PRODUCTS CORPORATION, OF BRIDGEPORT, CONNECTICUT, A CORPORATION OF DELAWARE

MOTOR VEHICLE CONSTRUCTION

Application filed August 23, 1926. Serial No. 130,829.

My invention relates to improvements in driving mechanism for motor vehicles wherein the weight of the vehicle together with its load may be utilized to assist the forward and rearward rotation of the driving wheels in addition to the torque delivered to them from the source of motive power.

My invention more specifically deals with mounting the load carrying member around the wheel drive shafts, which are concentric to the driving wheel centers, the wheels running on bearings mounted directly on the load carrying member with the wheel drive shafts passing through the load carrying member and operatively attached to the outer end of the wheel hub in the same fashion as in the well known type of "full floating" axle, with all of its well known attributes such as removing wheel driving shafts without removing the wheels, permitting the moving or towing of the vehicle in the event of a broken drive shaft or drive gear. The wheel drive shafts terminate a short distance either side of the vehicle center where they enter the hubs of large spur gears, which mesh with driving pinions, which in turn receive their driving torque from a conventional differential. The center of the differential shaft (which is coincident with that of the driving pinions) is normally directly below the axis of the driving wheels. Directly in line with this differential axis and carried from the load carrying member are hinge pins upon which are mounted swingable spring seats that arch up over the driving member providing attachment for conventional leaf springs supporting the frame and its load. The swingable spring seats and the differential and driving pinions mounted on the same center combine to function in a manner to be described later.

In my invention, I have provided for all clearances necessary to permit each element to perform its proper function, and at the same time have adequately housed all working parts to retain lubrication and prevent the entrance of foreign matter.

With the above and other objects in view, my invention consists in the arrangement, combination and construction of the various elements of my improved device as described in the specification, claimed in my claims and shown in the accompanying drawings, in which:

Fig. 1 is a rear elevation, partly in section, of the entire axle construction including the wheels and tires.

Fig. 2 is a section taken on line 2—2 of Fig. 1.

Fig. 3 is a section taken on line 3—3 of Fig. 1.

Fig. 4 is a side elevation of the rear portion of the vehicle chassis with the near wheel removed, showing in full and dotted lines the normal and the extreme position of the swingable parts when an obstacle is encountered by a road wheel.

In the drawings 11 is the wheel hub, in which are inserted the spokes 12 held in place by the spoke flange 16 and the spoke bolts 17. On the ends of the spokes 12 are mounted the felloes 13 which carry the rims 14, upon which are mounted the tires 15. 18 is a hub cap held in place by the spoke bolts 17. 19 and 20 are antifriction bearings between the wheel hub 11 and the load carrying shell 24 which is rigidly attached to the load carrying housing 25. The wheel drive shaft 23 passes through the shell 24 and is rigidly attached to the flange 21 by means of splines or keys (not shown) and the nut 22. The flange 21 in turn is bolted to the end of the wheel hub 11 by means of the driving bolts 32.

The brake drum 30 is attached to the spokes 12 by the bolts 31. The brake bands or shoes 33 are anchored to the load carrying member 25 and operated by the cam 34 and lever 35. The brackets 26 and 27 are integral with the load carrying member 25 and in them is securely fastened the hinge pin 29. On the hinge pin 29 is swung the spring seat 28 which arches up over the load carrying member 25. Above the member 25 the leaf spring 57 is securely fastened to the spring seat 28. This spring seat 28 is located laterally by the brackets 26 and 27, and is so constructed that the opening in it around the load carrying member 25 will permit considerable latitude of swinging motion when in operation.

Where the load carrying member 25 approaches the center of the vehicle it is flanged as at 36 and within it is mounted the antifriction bearing 38 and within the bearing 38 is mounted one end of the hub of the spur gear 40. The other end of the hub of the gear 40 is carried within the antifriction bearing 39 which in turn is mounted within the casing 37. The casing 37 is bolted against the flange 36 by means of a series of bolts 55 and makes an oil tight enclosure therewith. The wheel drive shaft 23 is splined in the hub of the gear 40 in such a manner that the shaft 23 can be removed laterally by taking off the hub cap 18 and removing the driving bolts 32, without disturbing the location of the gear 40.

In the lower portions of the flange 36 and the casing 37 are mounted the antifriction bearings 41 and 42 which support the hub ends of the driving pinion 43 which in turn meshes with the driving gear 40.

The construction is duplicated on the two ends of the axle. It will be noted, however, that the casing 37 extends across and ties the two load carrying members 25 together, and that the casing 37 is bridged and open in its central portion to admit the differential carrying casing made up of the parts 46 and 47 as particularly shown in Fig. 3. The opening in the casing 37 is made sufficiently large to clear the casing 46—47 in its extreme position. The casing parts 46 and 47 are bolted together securely by a series of bolts 56 and at the extreme ends are enclosed by the trunnion rings 48 which in turn are bolted against the inner walls of the casing 37 by bolts 49, the clearances being such that the casing 46—47 is definitely located laterally, but free to rotate with respect to the trunnion rings 48 which in turn are exactly concentric with the bearings 41 and 42 that support the gear 43 as well as concentric with the spring seat hinge pins 29.

Within the casing 47 is mounted the antifriction bearing 51 and within the casing 46 is mounted the antfriction bearing 52, and the bearings 51 and 52 in turn mutually support the differential body 50. Within the differential body 50 is a conventional differential gear train (not shown) extending from which are the two shafts 44 and 45 which in turn are splined into the driving pinions 43. On the differential body 50 is mounted the bevel gear 53 which receives its rotative motion from the source of power through the shaft 58 and bevel pinion 54. The shaft 58 is carried in the antifriction bearings 59 and 60 which in turn are mounted in the sleeve 61, and sleeve 61 is carried in the forward extending portion 62 of the casing 46. A propeller shaft (not shown) extends forward from the shaft 58 within the housing 63 and couples the shaft 58 to the source of motive power through a universal joint (not shown) within the socket housing 64 on the rear of the transmission 65, which is mounted on the frame 68.

The leaf springs 57 are connected to the vehicle frame 68 through the shackles 66 and 67, and to the spring seat 28 by means of the spring clips 69.

70 indicates a bump or obstruction in the road surface as met by the road wheel offering resistance to the free passage of the road wheel and requiring some elevation of the entire vehicle to pass over it. When such an obstruction as 70 is met, and the motive power is applied to the shaft 59, the power transmitted through the bevel gears 54 and 53, thence to and through the differential 50 to the shafts 44 and 45, causes the pinions 43 to start to climb up around the gears 40 carrying with them the casings 37 and 36 and rotating them and the load carrying member 25 about the axis of the wheels and the wheel drive shafts 23. This rotation of the member 25 causes the center of the hinge pin 29 to describe a circular path about the axis of the wheel and carry the spring seat 28 with it, forward and upward as shown by the dotted lines in Fig. 4. This upward motion of the spring seat 28 and springs 57 lifts the frame 58 upwardly, and the forward thrust of the propeller shaft housing 63 against the socket 64 on the transmission 65 which in turn is fastened to the frame 68, causes the frame to move forwardly. The rotative motion of the housing 46—47 relative to the casing 36—37 is accommodated by the rotation of the housing 46—47 within the trunnion rings 48, and the housings 36—37 rotate with the load carrying member 25 within the wheel bearings 19 and 20.

It will be evident that the lifting of the springs and hence the vehicle frame when meeting an obstruction or wheel resistance, causes the weight above the springs to exert a downward pressure (due to the force of gravity) on the pinions 43 and assist them in forcing the forward rotation of the gears 40, in addition to the rotative force of the pinions 43 derived from the source of power. This combination of forces accumulates until the road resistance is overcome and the wheel climbs up over the obstruction, whereupon the structure settles down to its normal position as indicated by the full lines in Fig. 2 and where the centers of the pins 29, and the shafts 44 and 45 are directly under the axis of the wheels. It should be quite evident that the vehicle weight and load assist the source of power in moving the vehicle forward, and the same forces reversed assist the vehicle when moving in a reverse direction.

In normal action, the moment a slight additional resistance to the rolling of the wheels occurs, they slow up or momentarily stop, and then the climbing effect takes place to assist the forward or rearward motion of the vehicle, very much like a tread mill or squirrel cage.

It will be apparent now that I have devised a novel and useful construction in a very simple combination. Obviously, changes in detail may be made by one skilled in the art without departing from the theory and spirit of my invention, and I do not care to limit myself to any particular form or arrangements of these elements.

What I claim is:

1. In a driving mechanism for a motor vehicle, in combination, a pair of aligned housing members connected together at their adjacent ends by a member bridging said ends, an axle shaft rotatably carried by each of said housings, said shafts being relatively widely spaced from each other at their adjacent ends, a wheel connected to the outer end of each of said shafts, a gear secured to the inner end of each of said shafts, a pair of aligned shafts rotatably supported eccentrically of and normally below said axle shafts, gears on the ends of the last mentioned pair of shafts meshing with the corresponding gears on said axle shafts, a differential mechanism connecting said pair of shafts, and a propeller shaft operatively connected to said differential mechanism for driving the same, said propeller shaft being supported to swing about the axis of said pair of shafts relative to said housings.

2. In a driving mechanism for a motor vehicle, in combination, a pair of aligned housings, a member connecting the adjacent ends of said housings, a gear rotatably supported between each of said housings and said member, a wheel rotatably carried by the outer end of each of said housings, an axle shaft within each of said housings detachably connecting said wheels with the corresponding of said gears, said shafts being relatively widely spaced at their adjacent ends, a casing rotatably supported by said member normally below said shafts, a pair of aligned shafts rotatably carried by said casing and each provided with a gear meshing with the gear on the corresponding axle shaft, a differential mechanism connecting said aligned shafts, means for driving said differential mechanism, and means rotatably supported relative to said housings for transmitting a load thereto.

3. In combination with a motor vehicle and the frame thereof, a pair of axially spaced tubular housing members having their remote ends rotatably supported by relatively rotatable wheels, a housing eccentric to said housings rotatably mounted therebetween, a pair of rotatable shafts within said eccentric housing, a differential connecting said shafts, a relatively short axle shaft rotatable in each of said pair of housings and non-rotatably secured to the corresponding of said wheels, a gear on the inner end of each of said axle shafts, a gear on each of said pair of shafts in mesh with the corresponding gear on said axle shafts, a gear concentric with and drivingly connected to said differential, a pinion carried by said eccentric housing, means for driving said pinion, and means for supporting said frame from said pair of housings permitting oscillation of said pair of housings about the axis of said eccentric housing.

4. In combination with a motor vehicle and the frame thereof, a pair of axially spaced tubular housing members having their remote ends rotatably supported by relatively rotatable wheels, a housing eccentric to said housings rotatably mounted therebetween, a pair of rotatable shafts within said eccentric housing, a differential connecting said shafts, a relatively short axle shaft rotatable in each of said pair of housings and non-rotatably secured to the corresponding of said wheels, a gear on the inner end of each of said axle shafts, a gear on each of said pair of shafts in mesh with the corresponding gear on said axle shafts, a gear concentric with and drivingly connected to said differential, a pinion carried by said eccentric housing, means for driving said pinion, means for maintaining said eccentric housing against rotation, and means for supporting said frame from said pair of housings permitting oscillation of said pair of housings about the axis of said eccentric housing.

5. In combination with a motor vehicle and the frame thereof, a pair of axially spaced tubular housing members having their remote ends rotatably supported by relatively rotatable wheels, a bridge rigidly connecting the adjacent ends of said housings, a housing eccentric to said housings rotatably mounted therebetween, a pair of rotatable shafts within said eccentric housing, a differential connecting said shafts, a relatively short shaft rotatable in each of said pair of housings and non-rotatably secured to the corresponding of said wheels, a gear on the inner end of each of said axle shafts, a gear on each of said pair of shafts in mesh with the corresponding gear on said axle shafts, a gear concentric with and drivingly connected to said differential, a pinion carried by said eccentric housing, means for driving said pinion, means for maintaining said eccentric housing against rotation, and means for supporting said frame from said pair of housings permitting oscillation of said pair of housings about the axis of said eccentric housing.

6. In combination with a motor vehicle and the frame thereof, a pair of spaced wheels, a pair of relatively short axially spaced tubular housing members rotatably carried between said wheels, a pair of relatively short axle shafts rotatably mounted in alignment in opposite ends of said housing and drivingly secured to the corresponding of said wheels, a casing rotatably mounted on and below said housing, shafting rotatably mounted in said casing in parallel and eccentric relation to said axle shafts, a driving connection between each of said axle shafts and said shafting, means for driving said shafting, load carrying springs secured to said frame, and means pivotally connecting said springs to said housing for rotation relative thereto about an axis aligned with the axis of said shafting.

7. In combination with a motor vehicle and the frame thereof, a pair of spaced wheels, a pair of relatively short axially spaced tubular housing members rotatably carried between said wheels, a pair of relatively short axle shafts rotatably mounted in alignment in opposite ends of said housing and drivingly secured to the corresponding of said wheels, a casing rotatably mounted on and below said housing, shafting rotatably mounted in said casing in parallel and eccentric relation to said axle shafts, a driving connection between each of said axle shafts and said shafting, means for driving said shafting, including a propeller shaft and cooperating gearing, said propeller shaft being maintained against swinging movement relative to said casing, load carrying springs secured to said frame, and means pivotally connecting said springs to said housing for rotation relative thereto about an axis aligned with the axis of said shafting.

8. In a motor vehicle driven mechanism, a housing unit, wheels rotatably mounted on the ends of said unit, aligned axle shafts rotatably mounted within said unit and each connected to one of said wheels, gears secured to the inner ends of said shafts, a housing rotatably supported by said housing unit eccentrically of said shafts, a differential mechanism rotatably mounted in the last mentioned housing, aligned shafts in the last mentioned housing connected to said differential mechanism, and gears on the ends of the last mentioned shafts meshing with the first mentioned gears.

ALEXANDER C. HAMILTON.